United States Patent [19]

Lamasney et al.

[11] 4,198,762

[45] Apr. 22, 1980

[54] DIGITAL RADAR LANDMASS SIMULATOR SYSTEM

[75] Inventors: Michael V. Lamasney, San Jose; Frederick C. Kaase, Sunnyvale, both of Calif.

[73] Assignee: The Singer Company, Binghamton, N.Y.

[21] Appl. No.: 939,529

[22] Filed: Sep. 5, 1978

[51] Int. Cl.$^2$ ............................ G01C 21/00; G01S 9/00
[52] U.S. Cl. ........................................ 35/10.4; 35/10.24
[58] Field of Search ................................. 35/10.4, 10.2

[56] References Cited

U.S. PATENT DOCUMENTS

| | | | |
|---|---|---|---|
| 3,131,247 | 4/1964 | Benamy et al. | 35/10.4 |
| 3,294,891 | 12/1966 | Antul et al. | 35/10.4 |
| 3,446,903 | 5/1969 | Beizer | 35/10.4 |
| 3,448,201 | 6/1969 | Hannon, Jr. | 35/10.4 |
| 3,539,696 | 11/1970 | Sweeney et al. | 35/10.2 |
| 3,699,669 | 10/1972 | Wolff | 35/10.4 |

Primary Examiner—Malcolm F. Hubler
Attorney, Agent, or Firm—Richard D. Lowe; Paul Hentzel; Jeff Rothenberg

[57] ABSTRACT

A digital radar landmass simulator system for an aircraft flight simulator including a mapping radar portion using a computer to transfer pertinent blocks of terrain defining parameters stored in a high volume memory to a high speed memory and a processor accessing the high speed memory for collecting those parameters which correspond to each radar sweep line and for developing therefrom a mapping radar display driving signal and a terrain following radar portion having a profile line memory for storing those sweep line parameters which are collected by the mapping radar portion processor and which coincide with the azimuth angle of a simulated terrain following radar antenna, and a pair of processors for developing therefrom both a terrain following radar display driving signal and an autopilot driving climb/dive signal.

13 Claims, 2 Drawing Figures

DIGITAL RADAR LANDMASS SIMULATOR SYSTEM

BACKGROUND OF THE INVENTION

1. Field of the Invention

The present invention relates generally to aircraft flight simulators and more specifically to a digital radar landmass simulator system which includes a mapping radar portion and a terrain following radar portion that utilizes data collected for appropriate sweeps of the mapping radar portion.

2. Description of the Prior Art

Since the training of aircraft pilots in regular aircraft may be expensive, inconvenient and dangerous, aircraft flight simulators are employed. Flight simulators duplicate, insofar as is practical, the appearance of an aircraft cockpit, the view from the windows, the sensation of flying the aircraft and of course the various aircraft radars.

High performance aircraft, such as those which are designated F111, usually employ at least two radars, a mapping radar and a terrain following or terrain avoidance radar. The mapping radar typically scans a portion of the terrain located within an azimuth sector in front of the aircraft. From the radar energy reflected by this terrain the radar develops a display, or map, of the terrain for presentation, typically in a depressed center PPI (Plan Position Indicator) format. Although such a display is of considerable value to a pilot, it does not provide sufficient information as to the height of objects in front of the aircraft. For this reason and in order to develop an autopilot controlling signal, the mapping radar is usually supplemented by a terrain following radar.

The terrain following or terrain avoidance radar employs a narrow beam width antenna which is aligned in azimuth with the instantaneous flight path of the aircraft and which scans, or nods, up and down slightly faster than once per second in order to illuminate with microwave energy a sector area in front of the aircraft. Note that the term "sweep" is used herein to refer to the action of a single radar pulse and the corresponding reaction of the radar receiver to the pulse and reflected energy therefrom in developing a single line of the radar display. The term "scan" refers to the action of the antenna and the aggregate of many sweep lines.

From the microwave energy which is reflected back to the antenna the terrain following radar develops, on a rectangular display device, a visual representation of the height of the terrain in front of the aircraft.

Typically the terrain following radar display is calibrated along a vertical axis from minus thirty-two degrees to plus eight degrees corresponding to the deviation of the antenna below and above, respectively, a stabilized horizontal reference. The horizontal axis of the display is calibrated in log time, or log distance, usually to ten miles.

The display is used in conjunction with a "command template", or zero command line. The template follows the locus of points in depression angle and range to the clearance plane, in other words, the display which would occur if the aircraft were flown parallel to flat terrain at the clearance altitude. The template rises from the bottom of the display asymtotically approaching the zero degree line. At the maximum radar range, the template rises rapidly to the top of the display.

By watching the radar display of the terrain in conjunction with the template, the pilot can fly the aircraft so as to maintain the desired clearance height. More specifically, when all points of the radar display of the terrain are located to the right of the template, the aircraft is too high. Conversely, when any portion of the display of the terrain penetrates the template, in other words is located to the left of the template, the pilot is warned that a correction is necessary to maintain the clearance height and possibly to avoid striking the terrain.

In a similar fashion, the terrain following radar utilizes the radar return and the template to develop a autopilot controlling climb/dive signal which is used by an aircraft autopilot when it is used to fly the aircraft. The autopilot controlling climb/dive signal, which is also called a command angle signal and which is designated by the symbol $\gamma_c$, is generated from a number of instantaneous command angle signals $\gamma'_c$, each of which are developed from a respective radar sweep. Typically, each instantaneous command angle signal is developed using analog circuitry, according to the formula:

$$\gamma'_c = \lambda[TF\gamma_{sc} + \theta_a + (1.02H_o/R_s - F_s + \Gamma_R)]$$

where $\lambda$ is a system gain constant, $TF\gamma_{sc}$ is the instantaneous antenna elevation angle with respect to the aircraft, $\theta_a$ is the aircraft pitch angle, or attitude, with respect to the stabilized horizontal reference, (and which may differ from the actual flight path), $H_o$ is the clearance height selected by the pilot, $R_s$ is the slant range from the aircraft to the respective illuminated element of the terrain, $F_s$ is a function of the aircraft type, its flight path angle and velocity, and derived from the ride selection, i.e., softness/hardness, and $\Gamma_R$ is the climb high function, typically the aircraft angle of attack (for positive angles only).

It should be noted that depending upon the implementation, the $\theta_a$ term may not be used, $\theta_a = 0$, and the functional relationship of $\Gamma_R$ may vary. The portion of the instantaneous command angle formula:

$$1.02\, H_o/R_s, 32\, F_s$$

defines the command template, or zero command line.

The autopilot controlling command angle signal $\gamma_c$ is developed by taking the maximum of the instantaneous command angle signals $Y'_c$ which are developed over one half antenna scan cycle.

One prior art mapping radar simulator system includes an update computer which receives aircraft parameters that identify the position of the simulated aircraft and a scan computer which receives antenna parameters that describe the position of the simulated mapping radar antenna. From a high volume regional memory containing, in compressed format, parameters defining the terrain over the entire area which is to be simulated, a regional controller associated with the update computer transfers pertinent terrain parameters to a decompressor for expansion before they are stored in a district memory.

Responsive to the antenna parameters, a controller associated with the scan computer transfers terrain parameters for subsequent map radar sweeps from the district memory to a high speed sector memory. The controller retrieves from the sector memory those parameters which describe the terrain along a line which is coincident with the sweep line and which extends from the Nadir point, the point on the terrain directly below the aircraft, to the limit of the sector memory. From the retrieved parameters, a radar equation processor develops a signal for intensity modulating a mapping radar display to simulate a mapping radar presentation.

Since the mapping and the terrain following radars are usually independent aircraft systems, a logical, straightforward simulator implementation would utilize a terrain following radar simulator system which is independent of the mapping radar simulator system. As is no doubt apparent, the terrain following system would include many components similar to those found in the mapping radar system, a high volume memory to store the terrain parameters for the simulated area, a computer for controlling the flow of pertinent terrain parameters to a high speed memory and a radar equation processor for developing from these parameters a signal to intensity modulate a terrain following radar display.

To avoid the duplication of components present in the above described independent approach, a prior art multiplexed radar simulator system was developed. The multiplexed system takes advantage of the dead time which is present following each sweep of the mapping radar, a time in excess of that required for one sweep of the terrain following radar.

The multiplexed system includes a multiplexer for sequentially selecting antenna parameters from the mapping radar antenna and the terrain following radar antenna for subsequent processing by a system somewhat similar to those just described. The system alternately develops signals for intensity modulating a single sweep line of a mapping radar display and one for modulating a single sweep line of terrain following display. Finally, the intensity modulating signals are switched by a second multiplexer to the appropriate radar display.

It is important to note that each of the sweep lines which are used to drive the display only contain information relevant to the instantaneous position of the respective radar antenna, such as would be displayed on a single line of radar display. In other words, they do not convey information which is relevant to other radar antenna positions.

Further, it is interesting to note that the above described prior art system makes use of film as a storage medium for storing the terrain parameters in the regional memory and employs analog circuits for much of the signal processing.

Although greatly simplifying the design of radar simulators, this multiplexed system suffers from a major disadvantage in that although the dead time following each sweep line of the mapping radar will only support one sweep of the terrain following radar, such dead time periods occur at too slow a rate to support the normal number of terrain following sweeps. For this reason it is necessary to "trick" the viewer by synthesizing sweeps to supplement those which are lost. Most simply, this can be done by redisplaying the previous sweep a number of times, as necessary to fill in the display. Unfortunately when the mapping radar is in a long range mode, as few as one in ten of the terrain following sweeps may be processed.

Another major disadvantage of the multiplexed system is that the system must be designed as a whole rather than optimized for a particular radar system, thus, requiring a number of compromises. For example, if the sweep rate of the mapping radar is not an even multiple of the terrain following radar, it must be adjusted appropriately.

More information is available in:

1. "Project 1183, An Evaluation of Digital Radar Landmass Simulation", a paper by T. Hoog, R. Dahlberg and R. Robinson, 7th NTEC Ind. Conf., 11/74, Orlando, FL. 2. "RF-4E Aircraft DRLM Simulator", LP-5698, 3/78. 3. "F4F Weapons System Trainer Set, DRLMS Simulation Maint. Manuel", LP-5597, 9/73. 4. "F4-E(18) DLRMS Update System, Op. and Maint. Manuel", LP-5687, 3/77. Items 2-4 were printed by the Singer Company, Link Division, Sunnyvale, California.

SUMMARY OF THE PRESENT INVENTION

It is thus an object of the present invention to provide a digital mapping and terrain following radar simulator system which is both simple and straightforward.

Briefly, the preferred embodiment of the present invention includes a mapping radar portion for simulating the display of the terrain in front of the simulated aircraft and a terrain following or terrain avoidance radar portion for simulating the display of the height of the terrain that is located along the terrain following radar antenna azimuth angle and for developing an autopilot controlling climb/dive signal.

The mapping radar portion has a regional memory containing terrain parameters for the simulation area, a regional controller for transferring to a district memory those parameters which represent the terrain in the vicinity of the aircraft, at times controlled by an update computer, a district controller for transferring to a sector memory those parameters which describe the terrain within a sector which is being swept by the radar antenna, at times which are controlled by a scan computer and for developing from the parameters stored in the sector memory a line signal containing those parameters which describe the terrain along a line which is coincident with the instantaneous sweep line and which extends from the Nadir point to the limits of memory and a radar equation processor for developing from the line signal an intensity modulated signal which drives a mapping radar display.

The terrain following portion has a profile line memory for receiving the line signal developed by the mapping radar portion processor and for storing that line signal which is developed by the processor when the mapping radar portion is processing the terrain along the terrain following radar antenna azimuth angle, a terrain following processor for developing from the signal which is stored in the profile line memory, an intensity modulated signal which drives a terrain following radar display and an autopilot processor for developing from the profile line signal an autopilot driving climb/drive signal.

The simplicity of the present invention is thus a material advantage thereof.

The ability to separately optimize the mapping radar portion and the terrain following portion of the present invention with a minimum amount of interaction is another advantage thereof.

Still another advantage of the present invention is that few sweep lines are lost requiring a minimum amount of sweep line synthesis.

These and other objects and advantages of the present invention will no doubt become apparent to those skilled in the art after having read the following detailed description of the preferred embodiment which is illustrated in the several figures of the drawing.

IN THE DRAWING

FIG. 1 is a block diagram illustrating a digital radar landmass simulator system in accordance with the present invention; and FIG. 2 is a block diagram further illustrating the terrain following portion of the digital radar landmass simulator which is shown in FIG. 1.

DETAILED DESCRIPTION OF THE PREFERRED EMBODIMENT

Figure 1:
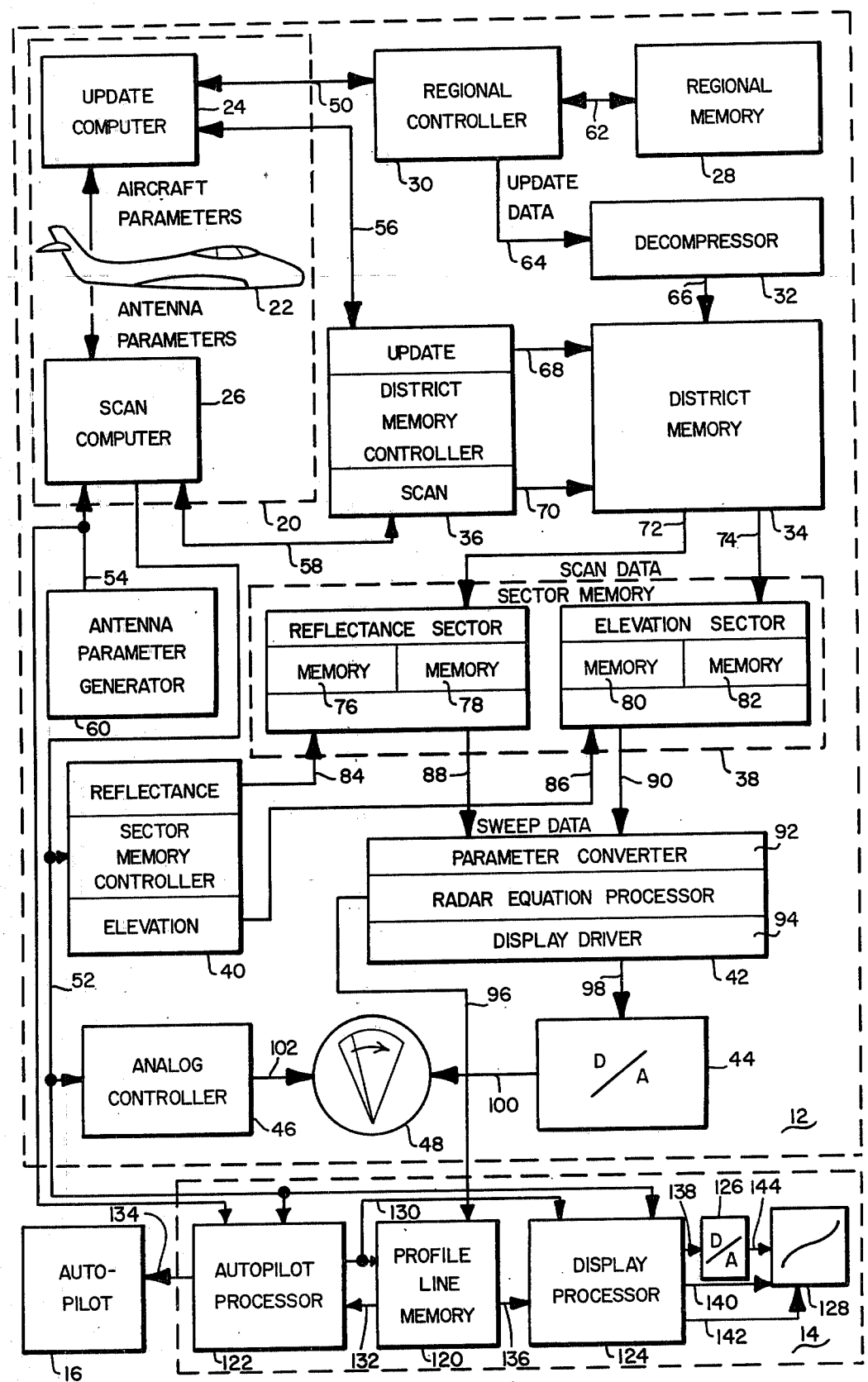

A preferred embodiment of a digital radar landmass simulator system in accordance with the present invention is shown in FIG. 1. The system, which is generally designated by the number 10, includes a mapping radar portion 12 and a terrain following or terrain avoidance portion 14 that drives an autopilot 16. The mapping radar portion utilizes a radar simulator computer 20 that receives descriptors of a simulated aircraft in flight from an aircraft simulator computer both of which are illustrated by an aircraft 22. The pertinent functional portions of the radar simulator computer are represented by an update computer 24 and a scan computer 26. Also illustrated are a regional memory 28 and its controller 30, a decompressor 32, a district memory 34 and its controller 36, a sector memory 38 and its controller 40, a radar equation processor 42, a digital-to-analog (D/A) converter 44, an analog controller 46, and a mapping radar display 48.

Aircraft 22, update computer 24 and scan computer 26 are functional blocks illustrating particular operations which are performed in the two computers. The aircraft exists only as a mathematical model particularized by certain aircraft parameters which are maintained in the aircraft simulator computer. Based upon inputs from various components of the aircraft simulator and solutions of the mathematical model pertinent descriptors of the simulated aircraft, such as its position, its altitude, its heading, etc., are obtained. Of particular importance to the radar simulator system is the current aircraft position which is coupled to the radar simulator computer, a general purpose mini-computer, such as the one which is designated 704 by the Raytheon Corporation. The current aircraft position is coupled by update computer 24 to regional controller 30 in the form of memory address and control signals which are developed on a bus 50, and the boresight of the mapping radar and terrain following radar antennas, which may be generated by either computer, are transferred in the form of signals developed on a bus 52 and a bus 54, respectively.

Additionally, the radar simulator computer acts as a sort of traffic controller. By means of memory address and control signals developed on bus 50, a bus 56 and a bus 58, the computer controls the timing and routing of the transfer of information between the various memories.

Although either computer may be employed to develop the antenna parameters, it is preferable to utilize a separate antenna parameter generator 60 operating under the control of computer 20 and employing, for example, a number of clock driven up/down counters to develop these parameters, freeing the computer for other tasks.

Regional memory 28 is comprised of one or more moving head disk memory units in which are stored terrain parameters which describe the elevation and planimetric parameters, including the radar reflectivity, of the area over which the aircraft simulator is to operate. Due to the voluminous nature of the parameters, which may describe, for example, one-half of the United States, the parameters are stored in compressed format. In other words, redundant parameters such as those which are used to describe flat or homogeneous topography are not stored in the memory.

Regional controller 30 effectuates the transfer of blocks of terrain parameters from regional memory 28 to decompressor 32 under the supervision of update computer 24. As indicated, the update computer only dictates the initiation and timing of the transfer. The parameter blocks are shunted around the computer by means of a bus 62 and a bus 64 in order to maximize the transfer rate and reduce the memory access load on the computer.

Prior to being coupled to district memory 34 by means of a bus 66, the selected parameter blocks, which have been stored in compressed format, are expanded in decompressor 32 such that each elemental area of the grid, or matrix, which comprises the total terrain is described by its own unique terrain parameters.

For reliability reasons, district memory 34 is preferably comprised of integrated circuit memory devices rather than other memory means such as head per track disk or drum units which may also be employed. The district memory is used to store the decompressed matrix of terrain parameters that describe a square area, with truncated corners, which surrounds the aircraft and which extends beyond the maximum radar range. The memory which may be conceptualized as a cylinder wrapping around horizontally (or vertically) is updated by each parameter block transfer from regional memory 28 such that a column (or row) of the terrain parameters is replaced.

Transfer of terrain parameters into and out of district memory 39 is effectuated by district controller 36. Since the primary responsibility of the district memory is to update sector memory 38 in concert with the horizontal motion of the mapping radar antenna, the district memory is updated during timing windows on a time available basis subject to interrupt. Transfer of parameter blocks into the district memory, which is supervised by update computer 24, is effectuated by signals developed on a bus 68; and transfer of parameters out of the district memory, which is supervised by scan computer 26, is effectuated by signals developed on a bus 70.

Prior to their transfer from district memory 34 to sector memory 38, the terrain parameters are separated such that the reflectance of each elemental area and the elevation of the corresponding elemental area are separately transferred by means of a bus 72 and a bus 74, respectively.

Sector memory 38, which is comprised of high speed integrated circuit memory devices, is divided into four portions, a portion 76 and a portion 78 for storing the reflectance portion of the terrain parameters and a portion 80 and a portion 82 for storing the elevation portion of the parameters, respectively. Double or interleaved, memories are used to permit one memory portion to be updated while the other is being accessed by radar equation processor 42. The memories are used to store those terrain parameters which describe a sector that emanates from the Nadir point, the point on the terrain directly below the aircraft, and that includes the antenna sweep line, the size of the sector being proportional to the selected radar maximum range and the scan rate of the mapping radar antenna.

Obviously the terrain parameters may be maintained in any of a large number of different formats. In the preferred embodiment a hybrid system is employed, one in which the elevation portion of the terrain parameters are maintained in a cartesian format and the reflectance portion of the terrain parameters are maintained in vector format, a format in which vectors are used to define the perimeter of areas. During the transfer of the parameters from sector memory 38 to radar equation processor 42, the parameters are converted to polar coordinates, the origin of which is the Nadir point.

Transfer of the terrain parameters from sector memory 38 to radar equation processor 42 is effectuated by sector controller 40 under the supervision of scan computer 26. More specifically, the controller develops address and control signals on a bus 84 and a bus 86 causing the high speed transfer on a bus 88 and a bus 90, respectively, of the reflectance and elevation portions of the parameters that describe a line which is coincident with the sweep line and which extends from the Nadir point outward to the extent of the sector memory.

Radar equation processor 42 includes a parameter converter 92 and a display driver 94. In general, parameter converter 92 adjusts the reflectance portion of each of the terrain parameters received from sector memory 38 such that each adjusted reflectance parameter represents the portion of the radar energy that the corresponding element of terrain would reflect back to the aircraft as determined by the radar equation. Additionally, the parameter converter arranges each of the adjusted parameters such that they are in the order required by the display driver and thus display 48.

More particularly, parameter converter 92 includes a number of adders, registers and tables arranged to synchronously operate upon the parameters, which are processed in logarithmic form, to expedite the calculation of a large number of products and quotients as required by the radar equation.

In calculating the attentuation which would be experienced by a radar wave traveling the round trip from the aircraft to a particular element of the terrain and back, the slant range, the range from the aircraft to that terrain element, must be determined. This is accomplished by simple trigonometric calculations using the ground range, the horizontal distance from the Nadir point to the terrain element, and the differential aircraft height, the difference between the absolute height of the aircraft and the terrain element height as expressed by the elevation portion of the terrain parameter set, an adjustment having been made for the curvature of the earth. The ground range and the differential height from two sides of a right triangle having the slant range as its hypotenuse.

Additionally, the depression angle, the angle between a horizontal plane defined by the aircraft, and the slant range line, and which is also the angle between the slant range line and a horizontal plane defined by the terrain element, is also calculated. The depression angle is used with the slope of the terrain, as determined by the differential height between adjacent elements of the terrain, to calculate the reflectivity of the particular terrain element as seen by the aircraft.

Each time the radar equation is solved and an adjusted reflectance parameter is obtained, the adjusted parameter is stored in a random access memory within display driver 94. The random access memory is so arranged, that adjusted reflectance parameters are stored at positions which correspond to their slant range from the aircraft. This arrangement not only permits the individual reflectance parameters to be accessed by the display driver as they are needed to form a sweep of the display, but it permits the parameter converter to access slant range location prior to storing a reflectance parameter therein to avoid the overwriting of a high reflectivity parameter by one of lower reflectivity at the same range.

Parameter converter 92 also provides shadowing, such as occurs naturally when a valley is observed by a hill. Since for each sweep the terrain parameters are serially processed starting with the set which describe the Nadir point and working outward, the series of calculated depression angles is normally a monotonically decreasing series. Should the series increase, as would occur when reflectance parameters which describe terrain elements in the valley were processed, parameter converter 92 will inhibit storage of these parameters until a depression angle is encountered which is less than the previous minimum depression angle, thereby producing a shadow on the display.

Finally, as the value of each adjusted reflectance parameter, the slant range to the respective terrain element and the corresponding depression angle are obtained, corresponding signals are developed on a bus 96 for use by terrain following portion 14 of the radar landmass simulator system.

Although parameter converter 92 operates in synchronization with the display of each point comprising a sweep line on display 48, it operates considerably ahead of the display, in fact many sweep lines ahead. This permits display driver 94, when it develops display driving signals on a bus 98, to access not only each of the adjusted reflectance parameters for the various slant ranges of the current sweep line, but also similarly disposed parameters for other sweep lines so as to take into account the beam spreading effects of the mapping radar antenna.

The signals developed on bus 98 by radar equation processor 42 are transformed by digital-to-analog converter 44 to an analog signal which is coupled to mapping radar display 48 by a line 100. Analog signals for driving the sweep of the display in synchronization with the intensity modulating signal developed on line 100 are generated by analog controller 46 on a bus 102.

Terrain following portion 14 includes a profile line memory 120, an autopilot processor 122, a display processor 124, a digital-to-analog converter 126, and a terrain following radar display 128. Profile line memory 120 has a number of memory locations arranged such that as radar equation processor 42 develops on bus 96 signals which represent the adjusted reflectance of a terrain element, the slant range to the element and the corresponding depression angle for elements which lie along sweep lines of the mapping radar antenna which are aligned with the azimuth angle of the terrain following radar antenna, the adjusted reflectance parameter and slant range signals are stored at locations within the memory which are addressed by their corresponding depression angle.

Note that for most implementations, the terrain following radar antenna azimuth angle will be aligned with the azimuth portion of the instantaneous aircraft flight vector.

Autopilot processor 122 includes circuitry for receiving the antenna elevation angle signals developed on bus 54 and the aircraft pitch angle information which is generated by computer 20 and transferred in the form of signals on bus 52. Additionally, the processor interrogates profile line memory 120 by means of normalized antenna elevation angle signals which it generates on a bus 130 and retrieves corresponding slant range signals on a bus 132. From these signals, the processor develops, according to the standard formula, autopilot controlling climb/dive signals on a bus 134. It should be noted that the terrain following antenna elevation angle signals are referenced to the aircraft, and it is thus necessary to normalize them by means of the aircraft pitch angle to obtain normalized antenna angle signals which correspond to the associated depression angle.

Display processor 124 utilizes circuitry which is similar to the circuitry in the display driver portion of radar equation processor 42. This portion of the display processor circuitry responds to normalized antenna elevation angle signals which are developed by autopilot processor 122 on bus 130 and adjusted reflectance parameter and slant range signals which are developed on a bus 136 by profile line memory 120 responsive to the same normalized antenna elevation angle signals. From these parameters the processor develops terrain following radar display driving signals representing one sweep of radar information on a bus 138. Additionally, the processor includes circuitry that develops, from template information which is generated by computer 20 and stored in a memory within the processor, a template display driving signal on a line 140 and develops analog display driving signals on a bus 142, respectively.

The digital intensity modulating signals developed on bus 138 are converted to analog format by digital-to-analog converter 126 and coupled by a line 144 to display 128 which is similar to a standard terrain following radar display.

Operationally, descriptors of a simulated aircraft in flight are calculated by the aircraft simulator computer and the aircraft position and radar antenna parameters which are generated by an antenna parameter generator 60 are maintained in functional portions of radar simulator computer 20 which are identified as update computer 24 and scan computer 26, respectively. Meanwhile, blocks of terrain defining parameters which are stored in compressed format in the relatively high volume regional memory 28 are transferred through decompressor 32 to the relatively high speed district memory 34. The transfer, which is effectuated by regional controller 30 and district controller 36 under the supervision of update computer 24, insures that at any time the district memory contains those parameters which describe the terrain which is potentially radar visible at the current aircraft position.

Prior to their being transferred from district memory 34 to the higher speed sector memory 38, blocks of parameters which describe the terrain in the sector being scanned by the mapping radar antenna are separated into elevation and reflectance portions.

The elevation and reflectance portions of the parameters are each stored in alternate portions of the sector memory permitting sector controller 40 under the supervision of scan computer 26 to simultaneously transfer from the other portions of the sector memory to radar equation processor 42 those sets of parameters which describe the terrain that lies along the current sweep line of the mapping radar. Also, as the parameter sets are transferred, they are transformed to polar coordinates.

As each of the sets of elevation and reflectance parameters are received by parameter converter 92, the converter synchronously processes the parameters to obtain the slant range from the aircraft to the terrain element defined by the set and the aircraft depression angle. Using this information, the converter solves the radar equation to obtain an adjusted reflectance parameter which represents the portion of the radar energy that the particular terrain element would reflect back to the aircraft and be received by the antenna.

Each of the adjusted reflectance parameters and the corresponding slant range from the aircraft to the described terrain element, which lie along sweep lines of the mapping radar antenna which correspond to the azimuth angle of the terrain following radar antenna, are stored in profile line memory 120 at an address which is indexed by the respective depression angle. Additionally, each of the adjusted reflectance parameters is stored in a random access memory within display driver 94 in order of its slant range from the aircraft. This enables the display driver to develop in synchronization with the radar display driving analog sweep signals which are generated by analog controller 46, intensity modulating mapping radar display driving signals which are converted by digital-to-analog converter 44 and used to intensity modulate display 48.

In general, autopilot processor 122, which accesses the profile line memory by means of normalized antenna elevation signals to obtain slant range information, develops therefrom, according to the standard formula, an autopilot driving climb/dive signal, and display processor 124, which receives from profile line memory 120 the appropriate slant range and adjusted reflectance parameters, develops signals suitable for driving terrain following radar display 128.

Figure 2:
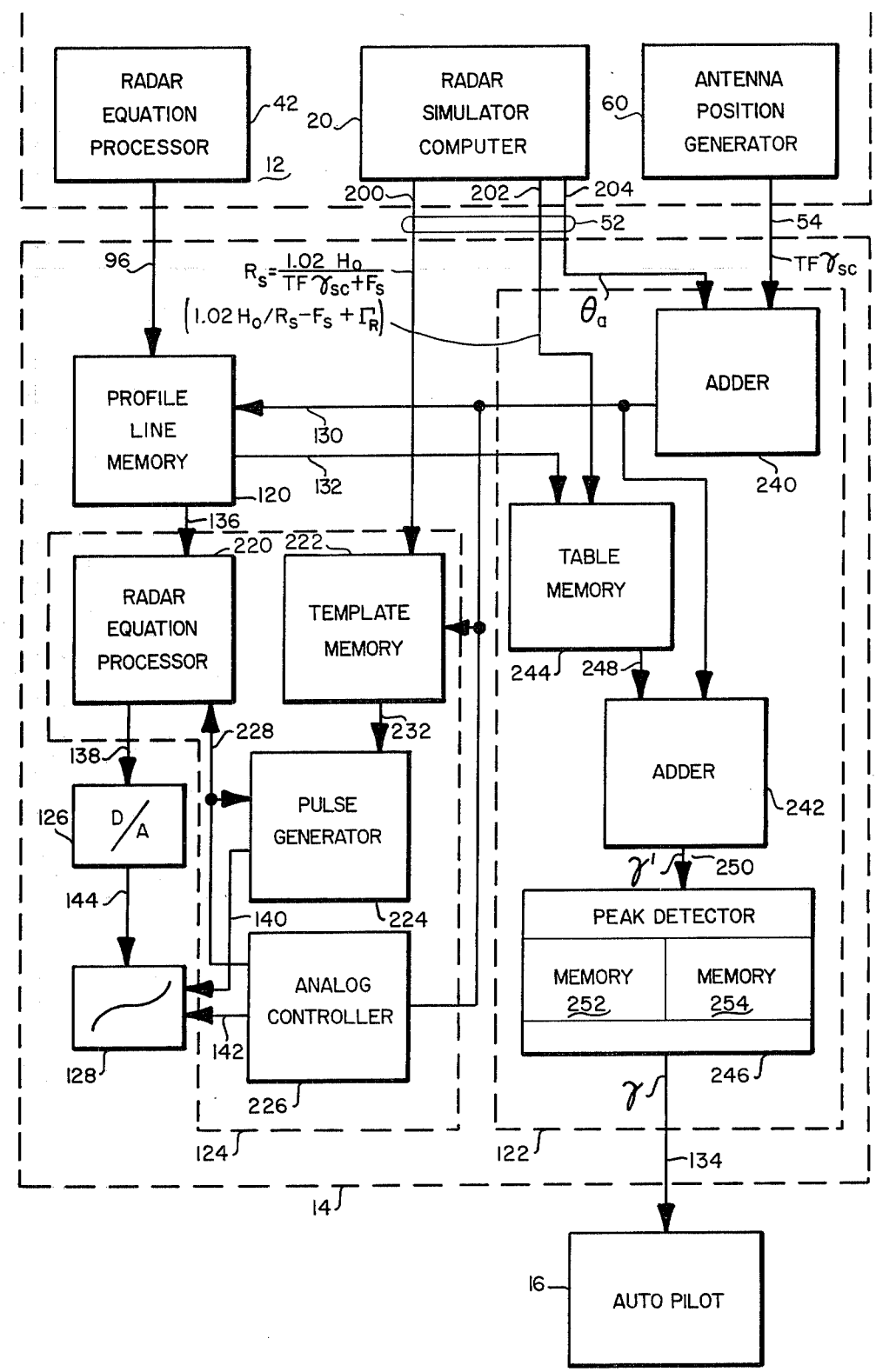

Terrain following portion 14 of the radar landmass simulator system is shown in greater detail in FIG. 2. In addition to the terrain following portion, applicable components of mapping radar portion 12 are shown, including radar equation processor 42, radar simulator computer 20 and antenna position generator 60. As previously indicated, radar equation processor 42 operates upon the terrain parameters which describe terrain elements that are located along each of the mapping radar sweep lines. By solving the radar equation and other mathematical operations, an adjusted reflectance parameter is obtained for each terrain element which is proportional to the radar energy which would be received at the aircraft from energy reflected by this respective terrain element. Additionally, the slant range from the aircraft to the terrain element and the depression angle are obtained. These parameters are made available to profile line memory 120 in the form of signals which are generated on bus 96.

For clarity, bus 52 is shown divided into a bus 200, a bus 202 and a bus 204. On bus 200, radar simulator computer 20, as needed, develops signals representing a table of slant ranges for various antenna depression angles, in other words, a table from which a terrain following radar command template may be generated. More specifically, the portion of the typical command angle formula:

$$\gamma'_c = \lambda[TF\gamma_{sc} + \theta_a + (1.02H_o/R_s - F_s + \Gamma_R)]$$

which describes the command template $$1.02H_o/R_s - F_s$$

is rearranged permitting values of slant range $R_s$ to be calculated for a family of terrain following radar antenna elevation angles $TF\gamma_{sc}$. Thus, the simulator computer solves the equation $$R_s = (1.02H_o)/(TF\gamma_{sc} = F_s)$$

and generates on bus 200 signals representing $R_s$ for the various values of $TF\gamma_{sc}$.

In addition to calculating the command template portion of the equation in this rearranged form, computer 20 calculates the template portion in the standard form for various values of slant range. To each of these the computer adds the climb high function $\Gamma_R$. In other words, the computer calculates the portion of the above command angle formula which is in parenthesis, specifically:

$$(1.02H_o/R_s - F_s + \Gamma_R).$$

The solutions and the corresponding slant ranges are made available to the terrain following portion in the form of signals generated on bus 202.

It is important to note that in both equations which are solved by the computer, the variables in the equations are relatively constant. The selected clearance height $H_o$, once selected by the pilot is not likely to be changed, at least for several seconds. Similarly, the ride selection once selected will probably be maintained and the velocity of the aircraft varies slowly and is most commonly held constant. Finally, at least with respect to the sweep rate, the climb high function is a constant. For this reason, the above described computer calculations need only occur very infrequently, at least with respect to the sweep rate.

The computer additionally generates on bus 204 a signal which is proportional to the aircraft pitch angle, and antenna position generator 60 develops on bus 54 a signal which is proportional to the instantaneous antenna elevation angle.

As previously indicated, profile line memory 120 is arranged to receive and store as a function of their respective depression angles those of the adjusted reflectance parameter and slant range signals which are generated on bus 96 for sweep lines of the mapping radar antenna which are aligned with the azimuth angle of the terrain following radar antenna. The memory further responds to each of the normalized antenna elevation angle addressing signals (depression angle signals) which are developed on bus 120 to develop signals which represent their associated slant range on bus 132 and signals which represent both their slant range and associated adjusted reflectance on bus 136.

Display processor 124 includes a radar equation processor 220, a template memory 222, a pulse generator 224 and an analog controller 226. The radar equation processor has circuitry similar to that which is contained in display driver 38 (shown in FIG. 1). It receives timing signals on a bus 228 which are developed by analog controller 226 and signals on bus 136 which represent the adjusted reflectance and slant range for each of the terrain elements which are indexed by normalized antenna elevation signals developed by autopilot processor 122 on bus 136. Responsive to these signals, the processor develops on bus 138 signals for intensity modulating terrain following radar display 128.

Template memory 222 is a random access memory arranged as two memory portions of five hundred and twelve, sixteen bit words each. Each portion is adapted to receive and store the signals which represent one table of slant ranges as a function of normalized antenna angles which are developed by computer 20 on bus 200. The arrangement of the memories permits one portion to be loaded by the computer while the other is being accessed by pulse generator 224. Responsive to normalized antenna angle addressing signals developed on bus 130 by autopilot processor 122, the proper memory portion develops signals proportional to the associated slant range on a bus 232.

In the preferred embodiment, pulse generator 224 includes a presettable clock-driven counter. The generator responds to timing signals developed on bus 228 and slant range signals which are developed on bus 232. Upon receiving signals representing the slant range for the current sweep line, the generator loads the slant range signals into the counter and counts down to zero. At zero count, the generator develops a pulse on line 142 to modulate terrain following display 120 to develop a command template.

Analog controller 226 responds to the normalized antenna angle signals which are developed on bus 130 and develops timing signals on bus 228 and analog signals on bus 142 which drive the sweep of terrain following display 128 in synchronization with the intensity modulating signals which are developed on lines 140 and 144.

Autopilot processor 22 includes a pair of adders 240 and 242, a table memory 244 and a peak detector 246. Adder 240, which is of conventional design, responds to the aircraft pitch angle signal that is developed on bus 204 and the terrain following antenna elevation angle signal that is developed on bus 54 and develops a signal on bus 130 which is proportional to the sum of these quantities, the normalized antenna angle signal.

Profile line memory 120 responds to the normalized antenna angle signals, which are developed on bus 130, as an address and is operative to develop signals on bus 132 which represent the slant range for that particular angle.

Table memory 244 is configured to store the signals developed by computer 20 on bus 202. The memory is so arranged as to store the values of angle, the portion of the command angle formula which is in parenthesis, at locations which are addressed by corresponding slant range values. The table memory responds to signals which represent various slant ranges and which are developed on bus 132 and develops signals on a bus 248 which represent the corresponding stored angles.

Adder 242, which is similar to adder 240, combines the angles represented by the signals developed on buses 130 and 248 and develops signals on a bus 250 proportional to their sum, the value of the instantaneous command angle signal.

Peak detector 246 includes a pair of registers 252 and 254 and a comparator. From the instantaneous command angle signals, which are developed on bus 250, the peak detector loads the first angle signals for each sweep into one of the registers. Thereafter, during the sweep, the detector compares the values of the stored angle signals with those of subsequently generated instantaneous command angle signals and updates the register to maintain the signals which represent the largest angle therein. During the next sweep, the detector loads the other register and generates signals on bus 134 which are proportional to the maximum angle signals which are stored in the first register, the value of the command angle.

It is anticipated that for certain combinations of scan rates, that the mapping radar portion of the radar landmass simulator will process an insufficient number of sweeps along the terrain following radar antenna azimuth angle to satisfy the terrain following portion. In this case, sweep stealing may be employed. In other words, when the mapping radar antenna is at either of the extremes of its travel, and thus processing redundant information, one sweep along the terrain following radar antenna azimuth angle may be processed.

Although the above invention is described with respect to the preferred embodiment, a radar landmass simulator system, it is understood that it may be used in other systems. This is particularly true of the autopilot processor which may be used in any application in which a table of slant range values as a function of depression angles is available, may be generated or especially where these values are being directly measured, such as in a real terrain following radar. Obviously, since certain signals which are synthesized in the simulator embodiment are directly available in the real aircraft or its terrain following radar, corresponding simulator components need not be employed. Among these signals which are directly available in the real environment are signals which represent the antenna elevation angle, generated on bus 54 by antenna position generator 60 of the simulator and the aircraft pitch angle, generated on bus 204 by simulator computer 20. Also, the values of slant ranges and adjusted reflectances which are stored by respective depression angles in profile line memory 120 of the simulator are directly available as outputs of the real radar.

The angles which are calculated in the simulator in computer 20 on bus 202 and which are stored in table memory 244 as a function of their respective slant range, may either be calculated by an onboard aircraft or by means of the prior art analog system.

It is anticipated that after having read the preceding disclosure, certain other alterations and modifications of the present invention will no doubt become apparent to those skilled in the art. It is therefore intended that the following claims be interpreted to cover all such alterations and modifications as fall within the true spirit and scope of the invention.

What is claimed is:

1. A digital radar landmass simulator system for synthesizing a mapping radar display and a terrain following radar display of terrain elements which would be radar visible by a mapping radar antenna and a terrain following radar antenna on an imaginary aircraft flying over a simulation area comprising:
    a mapping radar portion including,
        parameter memory means containing at least those parameter signals which describe elements of the terrain of the simulation area that lie along imaginary sweep lines of radar waves emanating from the mapping radar antenna,
        a parameter converter responsive to the terrain parameters in the parameter memory which describe each of the terrain elements that lie along each of the sweep lines and operative to develop signals which represent the slant range from the aircraft to the respective terrain element, the depression angle with respect to the respective terrain element and an adjusted radar reflectivity for the respective terrain element which is proportional to the portion of the radar wave which would be reflected by the respective terrain element and which would be received by the mapping radar antenna,
        a display driver for developing from the adjusted radar reflectivity signals which are developed by the parameter converter, a mapping radar intensity modulating signal, and
        mapping radar display means responsive to the mapping radar intensity modulating signal and operative to develop a mapping radar display of the radar visible portion of the simulation area; and
    a terrain following radar portion including,
        a profile line memory for storing the slant range signals, the depression angle signals and the adjusted radar reflectivity signals which are developed by the mapping radar portion parameter converter for terrain elements that lie along mapping radar sweep lines which include the azimuth angle of the terrain following radar antenna,
        terrain following processor means for developing from the slant range signals and the adjusted reflectivity signals which are stored in the profile line memory a terrain following radar intensity modulating signal, and
        terrain following radar display means responsive to the terrain following radar intensity modulating signal and operative to develop a terrain following display of the simulation area which is radar visible.

2. A digital radar landmass simulator system as recited in claim 1 further comprising autopilot processor means responsive to each of the successive elevation angles of the terrain following radar antenna and operative to develop a memory accessing signal, each of the memory accessing signals being used to retrieve from the profile line memory a slant range signal that describes a terrain element at an accessed depression angle and for developing from the memory accessing signals and the retrieved slant signals a climb/dive signal for driving an aircraft autopilot.

3. A digital radar landmass simulator system as recited in claim 2 wherein the autopilot processor means is further responsive to each of the various pitch angles of the aircraft and operative to develop each of the memory accessing signals.

4. A digital radar landmass simulator system as recited in claim 3 wherein the autopilot processor means develops, for each element of the terrain which lies along a simulated terrain following radar antenna scan line, an instantaneous command angle signal according to the formula $$\gamma'_c = \lambda[TF_{sc} + \theta_a + (KH_o/R_s - F_s + \Gamma_R)]$$

where
   $\gamma'_c$ is the instantaneous command angle,
   $\lambda$ is a gain constant,
   $TF\gamma_{sc}$ is the terrain following radar antenna elevation angle, $\theta_a$ is a function of the aircraft pitch angle,
K is a constant for the aircraft,
$H_o$ is a preselected clearance height,
$R_s$ is the slant range to the respective terrain element,
$F_s$ is a predetermined ride selection function of the aircraft parameters, and
$\Gamma_R$ is a predetermined climb high function of the aircraft parameters,
the largest instantaneous command angle signal which is developed for each half scan of the terrain following radar antenna being used to develop the command angle signal.

5. A digital radar landmass simulator system as recited in claim 3 wherein the autopilot processor includes:
   means for generating signals which are proportional to the instantaneous aircraft pitch angle;
   means for generating signals which are proportional to the instantaneous terrain following radar antenna elevation angle;
   means for adding each of the aircraft pitch angle signals to the corresponding one of the antenna elevation angle signals to develop the corresponding memory accessing signal;
   means responsive to each of the slant range signals retrieved from the profile line memory and operative to develop a combination angle signal which represents a constant times a preselected clearance height divided by the value represented by the respective slant range signal, the quantity less a predetermined ride selection function of the aircraft parameters plus a predetermined climb high function of the aircraft parameters;
   means for adding each of the combination angle signals to the corresponding one of the memory accessing signals to develop an instantaneous command angle signal; and
   means for retaining the maximum instantaneous command angle signal of those which are developed over each half scan of the terrain following radar antenna to develop the command angle signal.

6. A digital radar landmass simulator system as recited in claim 1 further comprising:
   means for developing a template range signal which is proportional to a predetermined constant times a predetermined clearance height divided by the sum of the instantaneous terrain following radar antenna elevation angle and a predetermined ride selection function of the aircraft parameters; and
   means for generating a template pulse a period following the initiation of each sweep line of the terrain following radar display means, the period being determined by the template range signal, and wherein the terrain following radar display means is further responsive to the template pulses and operative to display a command template.

7. A digital radar landmass simulator system as recited in claim 6 wherein the template range signal developing means predevelops a number of the template range signals for predetermined increments of terrain following radar antenna elevation angles, wherein the template range signal developing means has memory means for storing each of the predeveloped template range signals as a function of their corresponding predetermined antenna elevation angles, and wherein the template range signal memory means is responsive to the current instantaneous terrain following radar antenna elevation angle and operative to retrieve the template range signal which corresponds thereto.

8. A digital radar landmass simulator system as recited in claim 1 wherein the parameter memory means includes:
   a regional memory containing terrain parameters which describe at least some of the terrain elements which comprise the simulation area;
   a district memory for temporarily holding those terrain parameters which are stored in the regional memory and which describe terrain elements that are radar visible from the aircraft;
   a sector memory for temporarily storing at least those terrain parameters held in the district memory which lie along at least one of the mapping radar sweep lines;
   update computer means including regional controller means responsive to the aircraft parameters and operative to direct the flow of terrain parameters from the regional memory to the district memory; and
   scan computer means including the district controller means and a sector controller means responsive to the mapping radar antenna parameters and operative to direct the flow of terrain parameters from the district memory to the sector memory.

9. A digital radar landmass simulator system as recited in claim 8 further comprising autopilot processor means responsive to each of the various pitch angles of the aircraft and the successive elevation angles of the terrain following radar antenna and operative to develop a memory accessing signal, each of the memory accessing signals being used to retrieve from the profile line memory a slant range signal that describes a terrain element at an accessed depression angle and for developing from the memory accessing signals and the retrieved slant range signals a climb/dive signal for driving an aircraft autopilot.

10. A digital radar landmass simulator system as recited in claim 9 wherein the autopilot processor means develops, for each element of the terrain which lies along a simulated terrain following radar antenna scan line, an instantaneous command angle signal according to the formula $$\gamma'_c = \lambda[TF\gamma_{sc} + \theta_a + (KH_o/R_s - F_s + \Gamma_R)]$$

where
$\gamma'_c$ is the instantaneous command angle,
$\lambda$ is a gain constant,
$TF\gamma_{sc}$ is the terrain following radar antenna elevation angle,
$\theta_a$ is a function of the aircraft pitch angle,
K is a constant for the aircraft,
$H_o$ is a preselected clearance height,
$R_s$ is the slant range to the respective terrain element,
$F_s$ is a predetermined ride selection function of the aircraft parameters, and
$\Gamma_R$ is a predetermined climb high function of the aircraft parameters,
the largest instantaneous command angle signal which is developed for each half scan of the terrain following radar antenna being used to develop the command angle signal.

11. A digital radar landmass simulator system as recited in claim 9 wherein the autopilot processor includes:

means for generating signals which are proportional to the instantaneous aircraft pitch angle;

means for generating signals which are proportional to the instantaneous terrain following radar antenna elevation angle;

means for adding each of the aircraft pitch angle signals to the corresponding one of the antenna elevation angle signals to develop the corresponding memory accessing signal;

means responsive to each of the slant range signals retrieved from the profile line memory and operative to develop a combination angle signal which represents a constant times a preselected clearance height divided by the value represented by the respective slant range signal, the quantity less a predetermined ride selection function of the aircraft parameters plus a predetermined climb high function of the aircraft parameters;

means for adding each of the combination angle signals to the corresponding one of the memory accessing signals to develop an instantaneous command angle signal; and means for retaining the maximum instantaneous command angle signal of those which are developed over each half scan of the terrain following radar antenna to develop the command angle signal.

12. A digital radar landmass simulator system as recited in claim 8 further comprising:

means for developing a template range signal which is proportional to a predetermined constant times a predetermined clearance height divided by the sum of the instantaneous terrain following radar antenna elevation angle and a predetermined ride selection function of the aircraft parameters; and means for generating a template pulse a period following the initiation of each sweep line of the terrain following radar display means, the period being determined by the template range signal, and wherein the terrain following radar display means is further responsive to the template pulses and operative to display a command template.

13. A digital autopilot processor for developing an autopilot controlling climb/dive signal from a series of digital slant range signals each of which represent the slant range from a terrain following radar antenna to a respective one of a number of terrain elements which lie along a scan line of the terrain following radar antenna comprising:

means for developing a digital signal which is proportional to the instantaneous aircraft pitch angle;

means for developing a digital signal which is proportional to the instantaneous terrain following radar antenna elevation angle;

means for adding each of the aircraft pitch angle signals to a corresponding antenna elevation angle signal to develop a memory accessing signal;

means responsive to each of the slant range signals and operative to develop a series of digital combination angle signals each of which represents a constant times a preselected clearance height divided by the value represented by the respective slant range signal, the quantity less a predetermined ride selection function of the aircraft parameters plus a predetermined climb high function of the aircraft parameters;

means for adding each of the combination angle signals to the corresponding one of the memory accessing signals to develop an instantaneous command angle signal; and a peak detector for retaining the maximum instantaneous command angle signal which is developed over one half scan of the terrain following radar antenna to develop an autopilot controlling climb/dive signal.

* * * * *

UNITED STATES PATENT AND TRADEMARK OFFICE
CERTIFICATE OF CORRECTION

PATENT NO. : 4,198,762
DATED : April 22, 1980
INVENTOR(S) : Michael V. Lamasney et al It is certified that error appears in the above—identified patent and that said Letters Patent are hereby corrected as shown below:

Col. 2, line 46, substitute

-- $1.02\ H_o/R_s - F_s$ -- for " $1.02\ H_o/R_s\ 32\ F_s$ " in equation.

Signed and Sealed this

Twenty-fourth Day of February 1981

[SEAL]

Attest:

RENE D. TEGTMEYER

Attesting Officer

Acting Commissioner of Patents and Trademarks